June 30, 1931.  E. B. LE MARE  1,812,537

PRODUCTION OF GLASS IN STRIP FORM AND APPARATUS THEREFOR

Original Filed April 27, 1929

Inventor.
E. B. Le Mare
By Morrison, Kennedy Campbell
Attys.

Patented June 30, 1931

1,812,537

UNITED STATES PATENT OFFICE

ERNEST BRISTOW LE MARE, OF ST. HELENS, ENGLAND, ASSIGNOR TO PILKINGTON BROTHERS LIMITED, OF LIVERPOOL, ENGLAND, A LIMITED LIABILITY COMPANY

PRODUCTION OF GLASS IN STRIP FORM AND APPARATUS THEREFOR

Original application filed April 27, 1929, Serial No. 358,439, and in Great Britain May 1, 1928. Divided and this application filed May 21, 1930. Serial No. 454,292.

Applications have been filed in Great Britain, May 1, 1928; Belgium, April 26, 1929; Czechoslovakia, April 26, 1929; France, April 26, 1929; and Germany, April 26, 1929.

This invention relates to the production of glass in strip form and has for its object an improved process and apparatus whereby lengths of strip may be formed intermittently and the strips passed through a lehr at a speed equal to the speed of formation averaged over the periods of formation and intermittence.

In the production of glass in strip form, it is frequently necessary to form the strip at high speed, say, 30 feet per minute. If the strip were passed through a lehr at this speed, the necessary length of lehr would be impracticable.

It has been proposed to form strips at the desired high speed, but intermittently, the average speed of formation, including the time of intermittence, being a speed, say, 3 feet per minute, which is suitable for a lehr of normal length, and certain devices have been proposed whereby the strip is received at the high speed and reduced in speed to the low speed.

According to this invention the strip is received at the high speed and reduced in speed in a way which is simpler, maintains better the flatness of the strip and by simpler devices.

In the accompanying drawings:—

Figure 1:
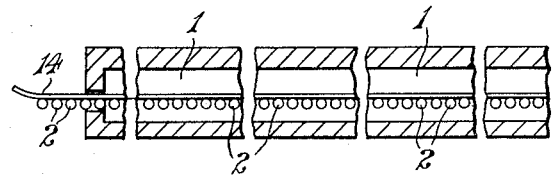
Figure 1 is a longitudinal section, partly broken away, of a lehr with roller bed for carrying out the invention.

Referring to Figure 1, the lehr 1 is provided with a bed of rollers 2. Some of the rollers 2 are driven by means to be hereinafter described, in a direction tending to retard the speed of the strip. The remaining rollers of the lehr, hereinafter called the ordinary rollers, are driven all at the same speed and in the same direction.

The shafts 3 of the rollers 2 turn in bearings 4 supported on a foundation wall 5 outside the lehr wall 6.

Alternate rollers 2 and $2^a$ carry on their shafts 3, extending beyond the bearings 4, chain wheels 30 and 31 respectively. The series of chain wheels 30 are driven by a chain 28 and the series 31 by a chain 29. The rollers 2 are driven at a constant speed while the rollers $2^a$ are driven by or through a reversible variable speed device. Then, by varying the speed and the direction of rotation of the rollers $2^a$, the effective speed of the bed may be varied within any desired limits. Thus, the rollers 2 may be turned at a constant speed of 30 feet per minute; then, to receive the strip, the rollers $2^a$ are also turned at this speed. At any suitable moment, the direction of rotation of the rollers $2^a$ is reversed and their speed gradually increased so as gradually to diminish the effective speed of the roller bed down to three feet per minute.

The strip then passes on to the ordinary rollers of the lehr which are driven at this speed.

Figure 2:
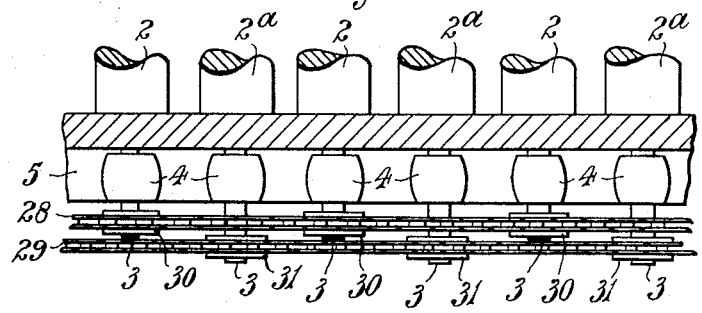
Figure 2 is part horizontal section thereof on a larger scale showing the driving devices of the rollers.
Figure 3:
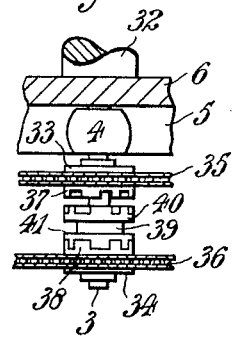
Figure 3 is a view similar to Figure 2 of an alternative form of the driving means.

Another device for varying the effective speed of the roller bed is shown in Figure 3, which is a view similar to Figure 2, showing one roller 32 only. The shaft 3 of this roller carries two chain wheels 33 and 34, which are engaged with two chains 35 and 36 respectively, travelling in opposite directions. The two chain wheels 33 and 34 can turn freely on the shaft 3 and are provided with clutch members 37 and 38 respectively. A piece 39, adapted to slide on a feather on the shaft 3 has clutch members 40 and 41 adapted to engage respectively with the clutch members 37 and 38. The chain 35 is adapted to turn the rollers so as to move the strip forward at the speed of, say, 30 feet per minute. The chain 36 is adapted to turn the rollers so as to move the strip backward at the speed of, say, 27 feet per minute. Every alternate roller is provided with the two chain wheels and clutches as in Figure 3, while the other rollers are permanently driven by the chains 35 as are the rollers of Figure 2. The operation of the device is then as follows:—All the clutch members 40 are engaged with the clutch members 37, so that all the rollers are turned to move the strip forward at the speed of 30 feet per minute. The bed of rollers is then adapted to receive the strip. As soon as the whole strip is on the bed, the piece 39 on the shafts of certain of the rollers is moved over to engage the clutch members 38 and 41, thereby causing these rollers to turn in the opposite direction at 27 feet per minute. For instance, every eighth roller may thus be reversed, when the effective speed of the bed will be reduced to about 23 feet per minute; then every fourth roller may be reversed, reducing it to 15 feet per minute and finally every second roller is reversed, reducing it to three feet per minute.

The rollers at the entering end of the lehr, for a certain distance, need not, any of them, be provided with the reversing device shown in Figure 3, and the proportion of the rollers so provided may be increased progressively along the lehr until finally every alternate roller is so provided.

In the above-described devices, the rate at which the speed of the strip is retarded is so related to the interval between the formation of successive strips that, on the ordinary rollers of the lehr, the strips follow one another closely.

The means for driving the rollers by chains is shown by way of example only; they may be driven by any suitable devices, such as bevel or spiral gears.

Having described my invention, I declare that what I claim and desire to secure by Letters Patent is:—

1. Process of gradually reducing the speed of a hot glass strip travelling on a roller-bed by turning some of the rollers supporting the strip in a forward direction and others in a backward direction.

2. Process of gradually reducing the speed of a hot glass strip travelling on a roller-bed by turning some of the rollers supporting the strip in a forward direction and others in a backward direction and varying the speed of the latter rollers.

3. Process of gradually reducing the speed of a hot glass strip travelling on a roller-bed by turning some of the rollers supporting the strip constantly in a forward direction and others intermittently in a backward direction.

4. Process of gradually reducing the speed of a hot glass strip travelling on a roller-bed by turning a certain number of the rollers supporting the strip constantly in a forward direction and a different number of the rollers in a backward direction.

5. Roller-bed for intermittently receiving hot glass strips at a high speed and reducing their speed, characterized by means for driving some of the rollers, in the portion of the bed over which the speed of the strip is reduced, at a constant speed, and means for driving the other rollers in the same portion independently, the latter means being adapted to reverse the direction of rotation of the rollers and to vary their speed, the two classes of rollers being so intermingled that the strip always rests on rollers of both classes.

In witness whereof I have affixed my signature hereto.

ERNEST BRISTOW LE MARE.